(12) United States Patent
Lin

(10) Patent No.: US 6,381,936 B1
(45) Date of Patent: May 7, 2002

(54) AUXILLARY DEVICE FOR A LAWN MOWER

(76) Inventor: Paul Lin, No. 8, Lane 762, Chung-Shan N. Rd., Yung-Kang City, Tainan Hsien (TW)

( * ) Notice: Subject to any disclaimer, the term of this patent is extended or adjusted under 35 U.S.C. 154(b) by 0 days.

(21) Appl. No.: 09/711,135

(22) Filed: Nov. 14, 2000

(51) Int. Cl.[7] .................. A01D 34/03; A01D 34/43; A01D 34/63
(52) U.S. Cl. .................. 56/16.7; 56/11.6; 56/12.7
(58) Field of Search .................. 56/16.7, 11.6, 56/12.7, 13.7, 16.9, 15.2

(56) References Cited

U.S. PATENT DOCUMENTS

| | | | | |
|---|---|---|---|---|
| 4,170,099 A | * | 10/1979 | Owens | 56/16.9 |
| 4,453,372 A | * | 6/1984 | Remer | 56/13.7 |
| 4,642,976 A | * | 2/1987 | Owens | 56/16.9 |
| 4,715,169 A | * | 12/1987 | Ould | 56/16.9 |
| 4,965,990 A | * | 10/1990 | Slawson, Sr. et al. | 56/13.7 |
| 5,040,360 A | * | 8/1991 | Meehleder | 56/11.6 |
| 5,226,284 A | * | 7/1993 | Meehleder | 56/11.6 |

* cited by examiner

Primary Examiner—Robert E. Pezzuto
Assistant Examiner—Árpád Fábián Kovács
(74) Attorney, Agent, or Firm—Baker Botts L.L.P.

(57) ABSTRACT

An auxiliary device includes a connecting member mounted to a lawn mower. An anchoring member has a second mounting wall confronting a first mounting wall of the connecting member in a first direction. An operating member has a secured portion connected to the anchoring member and an operating portion extending from the secured portion in a second direction transverse to the first direction. An interconnecting member is disposed between the first and second mounting walls to permit the anchoring member to rotate relative to the second coupling portion around an adjusting axis parallel to the first direction. A motor is mounted in the operating portion, and has an output shaft with an axis extending in the second direction. The motor is powered by a power supplying member of the lawn mower. A grass cutting member is mounted on the operating portion, and is driven by the output shaft to rotate about the axis such that a sweeping plane of the grass cutting member is adjusted by angular movement of the second mounting wall relative to the first mounting wall to increase a mowing area of the mower or to enable operation of the cutting member on an obstructed area. A locking member is disposed to arrest relative rotation between the first and second mounting walls.

9 Claims, 7 Drawing Sheets

__US 6,381,936 B1__

AUXILLARY DEVICE FOR A LAWN MOWER

BACKGROUND OF THE INVENTION

1. Field of the Invention

This invention relates to a lawn mower, more particularly to an auxiliary device adapted to be electrically and adjustably connected to a lawn mower for increasing the mowing area and for permitting operation on an obstructed area.

2. Description of the Related Art

A conventional lawn mower includes a base seat, two pairs of front and rear wheels which are mounted under the base seat, a motor which is mounted on the base seat and which has an output shaft with an axis extending downwardly towards the ground, a rotary blade which is mounted under the base seat and which is driven by the output shaft of the motor to rotate about the axis, and a handle and a rear bag which are mounted on a rear side of the base seat. It is noted that the conventional lawn mower is not suited for operation on an obstructed area, such as a wall corner or a trench side.

SUMMARY OF THE INVENTION

The object of the present invention is to provide an auxiliary device which is adapted to be electrically and adjustably connected to a lawn mower for increasing the mowing area and for permitting operation on an obstructed area.

According to this invention, the auxiliary device includes a connecting member which has a first coupling portion that is adapted to be mounted to a base seat of a lawn mower, and a second coupling portion that extends from the first coupling portion in a first direction. The second coupling portion has a first mounting wall which faces towards the first direction. An anchoring member has a second mounting wall which confronts the first mounting wall. An operating member has a secured portion which is connected to the anchoring member at a position distal to the second mounting wall, and an operating portion which extends from the secured portion in a second direction transverse to the first direction and which is adapted to be disposed beyond and outwardly of wheels of the lawn mower. An interconnecting member is disposed between the first and second mounting walls to permit the anchoring member to rotate relative to the second coupling portion around an adjusting axis that is parallel to the first direction. A motor is mounted in the operating portion, and has an output shaft with a second axis which extends in the second direction. The motor is adapted to be powered by a power supplying member of the lawn mower. A grass cutting member is mounted on the operating portion, and is driven by the output shaft to rotate about the second axis such that a sweeping plane of the grass cutting member is adjusted by angular movement of the anchoring member relative to the second coupling portion between a first position where the second axis is parallel to a first axis of a rotary blade of the lawn mower so as to increase a mowing area of the lawn mower, and a second position where the second axis is inclined to the first axis so as to enable the grass cutting member to be operated on an obstructed area. A locking member is disposed between the second coupling portion and the anchoring member to arrest relative rotation between the second mounting wall and the first mounting wall.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
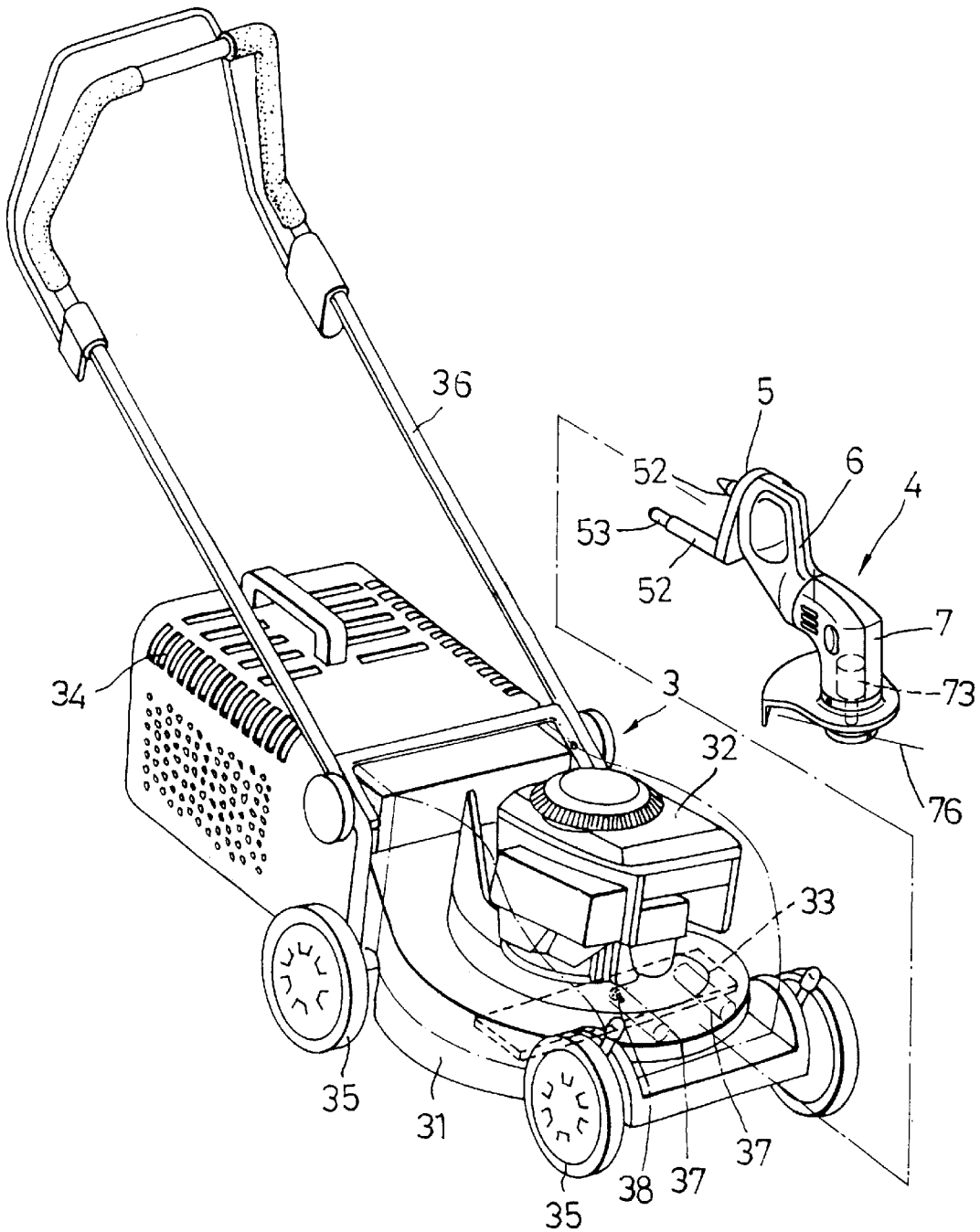
FIG. 1 is a perspective view of a first preferred embodiment of an auxiliary device and a lawn mower according to this invention.

Before the present invention is described in greater detail, it should be noted that same reference numerals have been used to denote like elements throughout the specification.

Referring to FIG. 1, the first preferred embodiment of the auxiliary device 4 according to the present invention is shown to be mounted on and connected electrically to a lawn mower 3. The lawn mower 3 generally includes a base seat 31, two pairs of front and rear wheels 35 which are mounted to space the base seat 31 apart from the ground, a first motor 32 which is mounted on the base seat 31 and which has a first output shaft (not shown) with a first axis and extending downwardly towards the ground, a rotary blade 33 which is driven by the first motor 32 and which is rotatable about the first axis, a power supplying member (not shown) for supplying electrical energy to the first motor 32, a rear bag 34 which is mounted on a rear end of the base seat 32, and a handle 36 which extends upwardly and rearwardly of the base seat 32. The two front wheels 35 have two foremost portions which are distal to the base seat 31 and which define a front boundary line. Each pair of the front and rear wheels 35 have two lateral walls which are distal to the base seat 31 and which define a lateral boundary line. In this embodiment, two insert holes 37 are formed in a front end of the base seat 31. An electrical socket 38 is disposed in one of the insert holes 37 and is connected electrically to the power supplying member.

Figure 2:
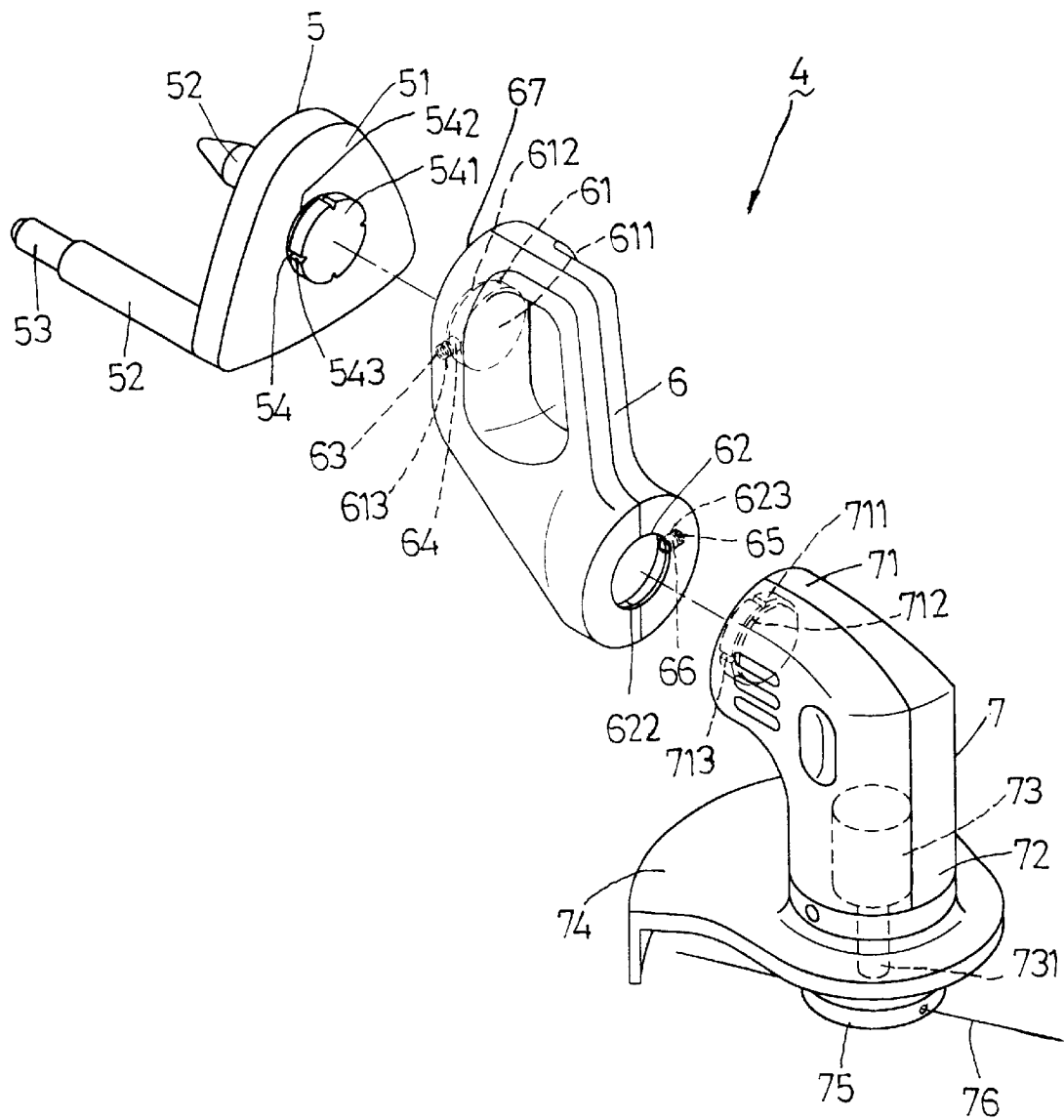
FIG. 2 is an exploded perspective view of the first preferred embodiment.
Figure 3:
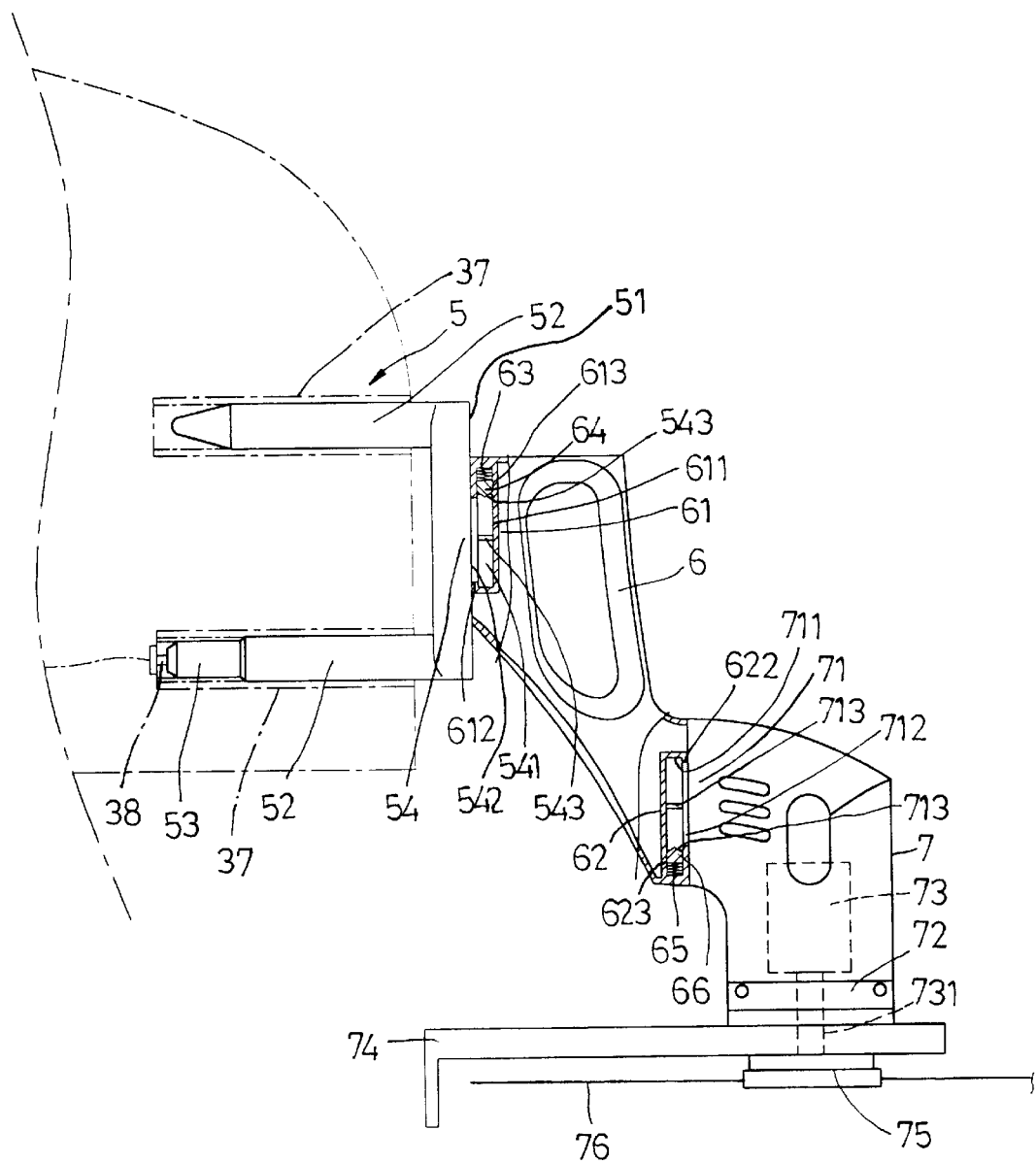
FIG. 3 is a partly sectional view of the first preferred embodiment.

With reference to FIGS. 2 and 3, the auxiliary device 4 includes a connecting member 5, an anchoring member 6, and an operating member 7.

The connecting member 5 has a first coupling portion which includes two insert plugs 52 to be inserted into the insert holes 37 such that one of the insert plugs 52 has an electric contact 53 that is connected electrically to the electrical socket 38. The connecting member 5 further has a second coupling portion which extends from the first coupling portion in a first direction and which has a first mounting wall 51 that faces towards the first direction.

The anchoring member 6 has a proximate end portion with a second mounting wall 67 which confronts the first mounting wall 51, and a distal end portion which is opposite to the proximate end portion.

An interconnecting member includes a first plug portion 54 and a first socket portion 61 which are disposed on the first mounting wall 51 and the second mounting wall 67, respectively. The first plug portion 54 includes a plug part 541 and a reduced part 542 which is disposed between the first mounting wall 51 and the plug part 541. A plurality of engaging slots 543 are formed in an annular periphery of the plug part 541 and are spaced angularly apart from one another. The first socket portion 61 includes a socket part 611 and a reduced part 612 which engage respectively the plug part 541 and the reduced part 542 so as to permit rotation of the second mounting wall 67 relative to the first mounting wall 51 about an adjusting axis parallel to the first direction, while preventing the movement of the second mounting wall 67 away from the first mounting wall 51 in the first direction. The distal end portion of the anchoring member 6 is disposed in an inclining axis that is inclined from the adjusting axis.

A locking member includes a locking latch 64 which is mounted in a groove 613 that is formed in the anchoring member 6 radial to the adjusting axis to communicate with the first socket portion 61. Thus, the locking latch 64 is movable along the groove 613 between a locking position, where the locking latch 64 engages one of the engaging slots 543 in the first plug portion 54 to arrest relative rotation between the first and second mounting walls 51,67, and a releasing position, where the locking latch 64 is moved away from the first plug portion 54. The locking member further includes a biasing member 63 which is mounted in the groove 613 for biasing the locking latch 64 toward the locking position.

The operating member 7 has a secured portion 71 which is connected to the distal end portion of the anchoring member 6 in a manner similar to that of the interconnecting member described previously, and an operating portion 72 which extends from the secured portion 71 in a second direction transverse to the first direction. In particular, a second plug portion 711 is disposed on the secured portion 71 and engages a second socket portion 62 which is formed in the distal end portion of the anchoring member 6 so as to permit relative rotation between the anchoring member 6 and the operating member 7 while preventing relative movement therebetween along the inclining axis by means of reduced parts 712,622 thereon. A locking latch 66 is mounted in a groove 623 which is formed adjacent to the second socket portion 62 and which extends radial to the inclining axis. The locking latch 66 is movable along the groove 623 between a locking position for engaging one of the engaging slots 713 in the second plug portion 711, and a releasing position for movement away from the second plug portion 711. A biasing member 65 is mounted in the groove 623 for biasing the locking latch 66 towards the locking position.

Figure 4:
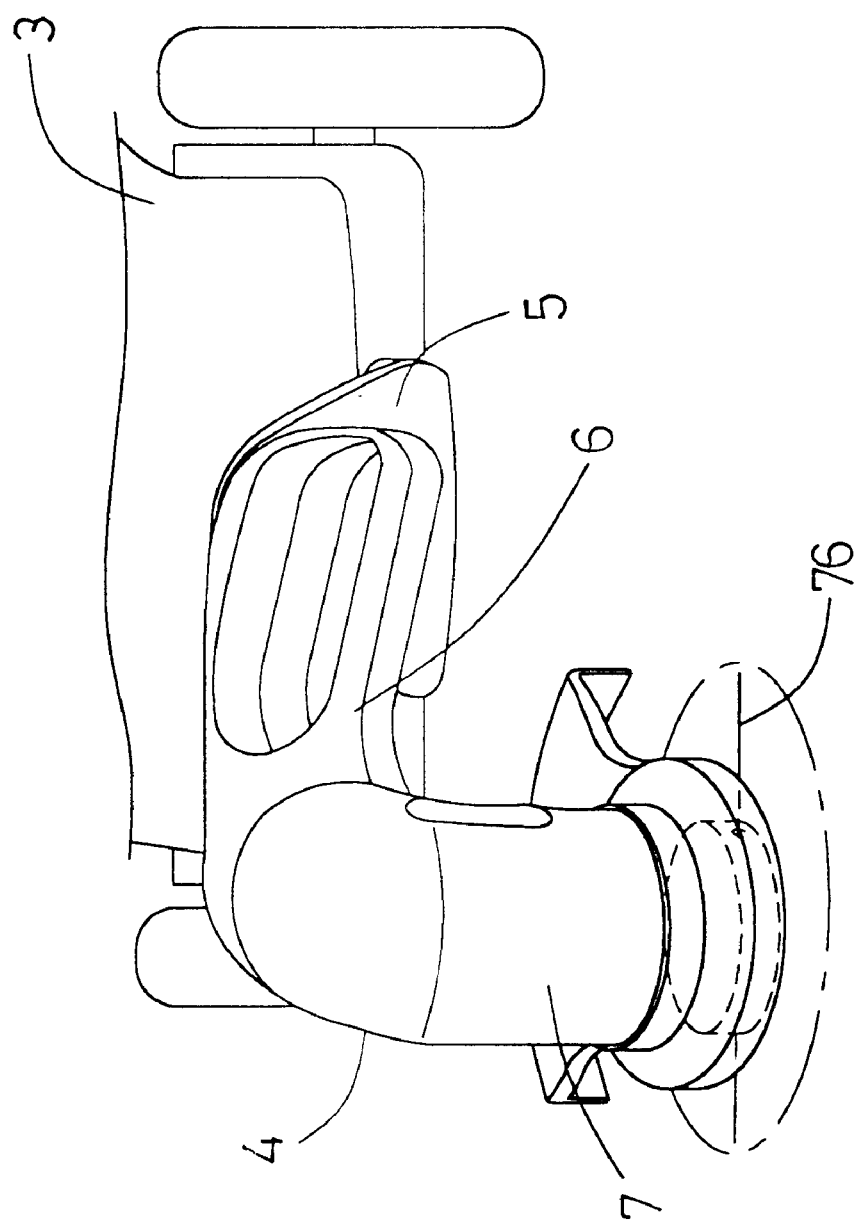
FIG. 4 is a perspective view showing a grass cutting member of the first preferred embodiment in a first position.
Figure 5:
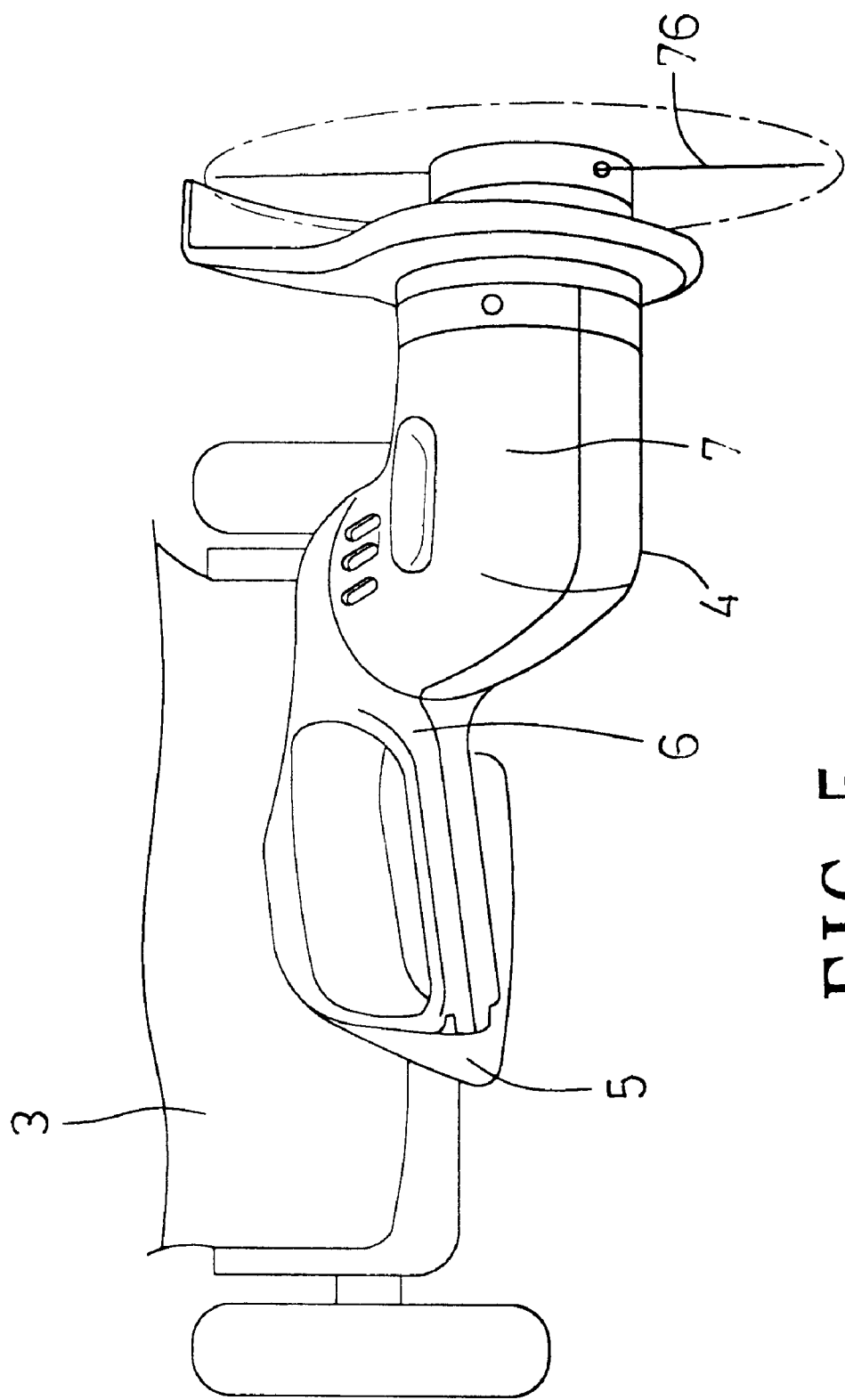
FIG. 5 is a perspective view showing the grass cutting member of the first preferred embodiment in a second position.

In this embodiment, the operating portion 72 of the operating member 70 is adapted to be disposed beyond and outwardly of the front boundary line of the lawn mower 3. Note that the operating portion 72 is also adapted to be disposed beyond and outwardly of one of the lateral boundary lines. A second motor 73 is mounted in the operating portion 72, and has a second output shaft 731 with a second axis that extends in the second direction and that is adapted to be powered by the power supplying member of the lawn mower 3 by means of connecting wires (not shown) connected to the electric contact 53. A mounting seat 75 is secured on and is rotatable with the second output shaft 731. A grass cutting member 76 is made of a flexible wire, and is mounted on the seat 75 so as to be driven by the second output shaft 731 to rotate about the second axis. As such, referring to FIGS. 4 and 5, a sweeping plane of the grass cutting member 76 can be adjusted by angular movement of the anchoring member 6 relative to the connecting member 5 and by angular movement of the operating member 7 relative to the anchoring member 6 between a first position where the second axis, about which the grass cutting member 76 is rotated, is parallel to the first axis, about which the rotary blade 22 is rotated, go as to increase a mowing area of the lawn mower 3 (as shown in FIG. 4), and a second position where the second axis is inclined to the first axis (as shown in FIG. 5) so as to enable the grass cutting member 76 to be operated on an obstructed area, such as a wall corner, a trench side, etc. An arcuate shielding member 74 is mounted between the second output shaft 731 and the mounting seat 75 for shielding a part of the grass cutting member 76.

Figure 6:
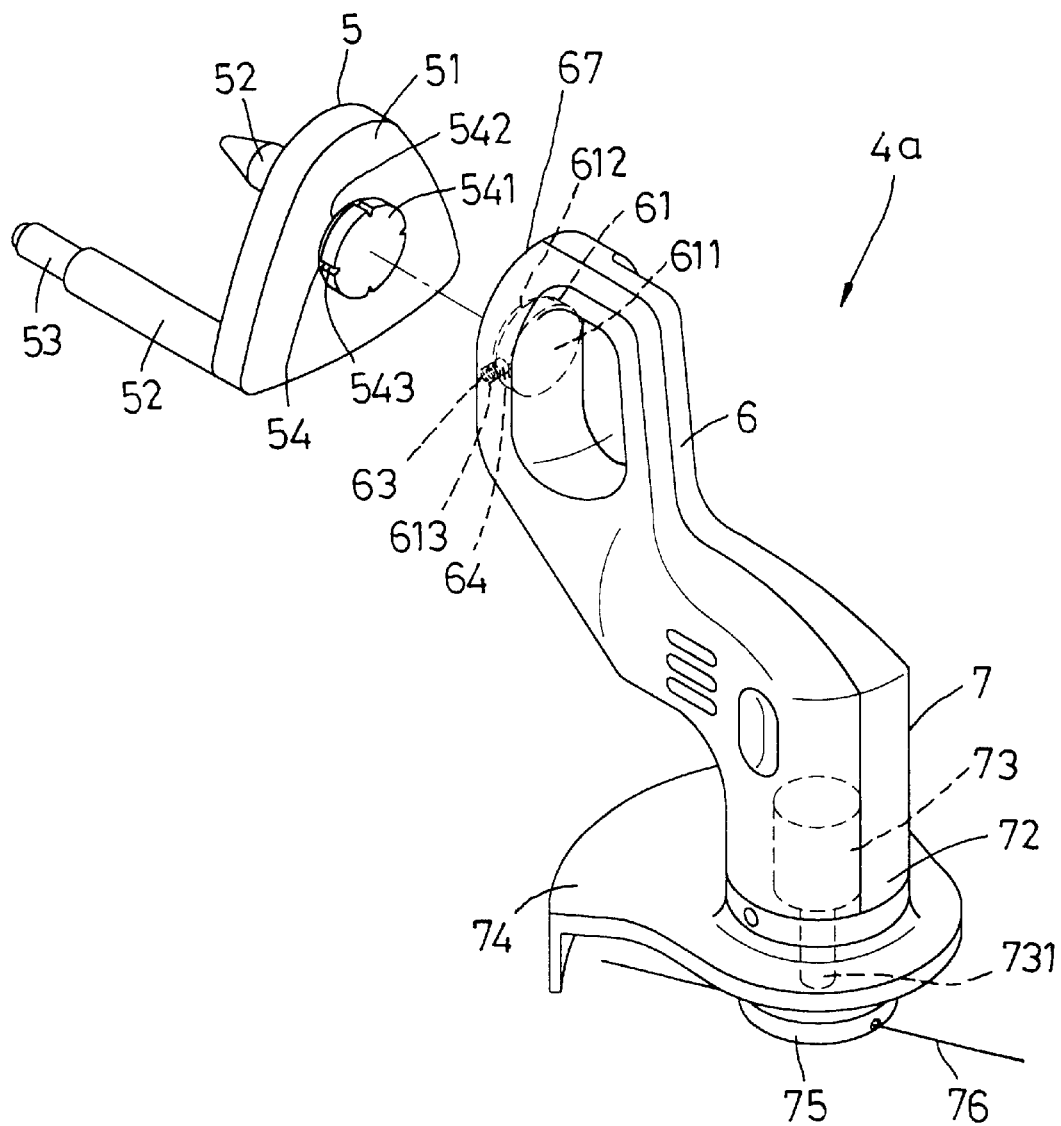
FIG. 6 is an exploded perspective view of a second preferred embodiment of the auxiliary device according to this invention.

Referring to FIG. 6, the second preferred embodiment of the auxiliary device 4a according to this invention is shown to be similar to the first preferred embodiment, except that the anchoring member 6 and the operating member 7 are formed integrally with each other and are not formed with provision of second plug and socket portions.

Figure 7:
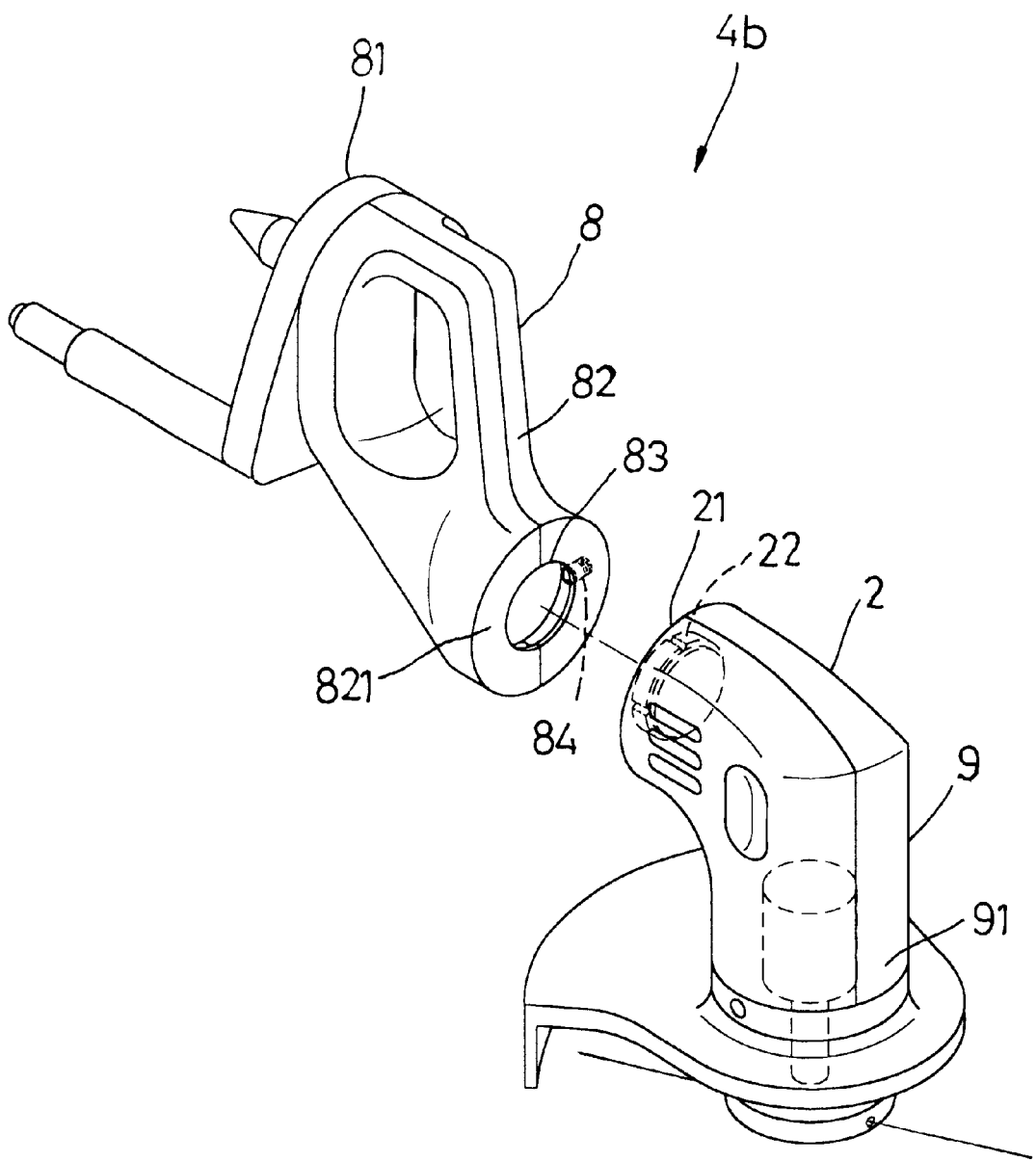
FIG. 7 is an exploded perspective view of a third preferred embodiment of the auxiliary device according to this invention.

Alternatively, referring to FIG. 7, the third preferred embodiment of the auxiliary device 4b according to this invention is shown to include a connecting member 8 which includes a first coupling portion 81 that is adapted to be mounted to the base seat 31 of the lawn mower 3, and a second coupling portion 82 that is connected integrally to the first coupling portion 81 and that has a first mounting wall 821. An anchoring member 2 has a second mounting wall 21 which confronts the first mounting wall 821. An interconnecting member includes socket and plug portions 83,22 which are formed in the first mounting wall 821 and on the second mounting wall 21 and which rotatably engage each other so as to permit the anchoring member 2 to rotate relative to the connecting member 8 around an adjusting axis. A locking member 84 is disposed to arrest relative rotation between the first and second mounting walls 821,21. An operating member 9 has a secured portion which is secured to the anchoring member 2, and an operating portion 91 which is similar to that of the previous preferred embodiments.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. An auxiliary device adapted to be electrically connected to a lawn mower which includes a base seat, two pairs of front and rear wheels mounted to space the base seat apart from the ground, a first motor mounted on the base seat and having a first output shaft with a first axis and extending downwardly towards the ground, a rotary blade driven by the first motor and rotatable about the first axis, and a power supplying member for supplying electrical energy to the first motor, the two front wheels having two foremost portions which are distal to the base seat and which define a front boundary line, each pair of the front and rear wheels having two lateral walls which are distal to the base seat and which define a lateral boundary line, said auxiliary device comprising:

a connecting member having a first coupling portion adapted to be mounted to the base seat and a second coupling portion extending from said first coupling portion in a first direction, said second coupling portion having a first mounting wall facing towards the first direction;

an anchoring member having a second mounting wall that confronts said first mounting wall;

an operating member having a secured portion connected to said anchoring member at a position distal to said second mounting wall, and an operating portion extending from said secured portion in a second direction transverse to the first direction and adapted to be disposed beyond and outwardly of one of the front and lateral boundary lines;

an interconnecting member disposed between said first and second mounting walls to permit said anchoring member to rotate relative to said second coupling portion around an adjusting axis that is parallel to the first direction;

a second motor mounted in said operating portion and having a second output shaft with a second axis extending in the second direction, said second motor being adapted to be powered by the power supplying member;

a grass cutting member mounted on said operating portion and driven by said second output shaft to rotate about the second axis such that a sweeping plane of said grass cutting member is adjusted by angular movement of said anchoring member relative to said second coupling portion between a first position where the second axis is parallel to the first axis so as to increase a mowing area of the lawn mower, and a second position where the second axis is inclined to the first axis so as to enable said grass cutting member to be operated on an obstructed area; and a locking member disposed between said second coupling portion and said anchoring member to arrest relative rotation between said second mounting wall and said first mounting wall.

2. The auxiliary device as claimed in claim 1, wherein said grass cutting member is made of a flexible wire.

3. The auxiliary device as claimed in claim 1, wherein said first coupling portion of said connecting member includes at least one insert plug adapted to be inserted into the base seat and adapted to connect electrically with the power supplying member.

4. The auxiliary device as claimed in claim 1, wherein said interconnecting member includes a first plug portion and a first socket portion which are disposed between said first and second mounting walls, said first plug portion being inserted rotatably into said first socket portion about the adjusting axis.

5. The auxiliary device as claimed in claim 4, wherein said first plug portion is disposed on and projects from said first mounting wall along the adjusting axis, said first socket portion being disposed in said second mounting wall and being sleeved rotatably on said first plug portion so as to permit rotation of said anchoring member relative to said connecting member about the adjusting axis.

6. The auxiliary device as claimed in claim 5, wherein said locking member includes a locking latch mounted in said anchoring member adjacent to said first socket portion and extending and movable radial to the adjusting axis between a locking position where said locking latch abuts against said first plug portion, and a releasing position where said locking latch is moved away from said first plug portion, said locking member further including a biasing member mounted in said anchoring member for biasing said locking latch toward the locking position.

7. The auxiliary device as claimed in claim 5, further comprising a second plug portion and a second socket portion which are disposed between said anchoring member and said secured portion of said operating member so as to connect said secured portion to said anchoring member, said second plug portion being inserted rotatably into said second socket portion about an inclining axis that is inclined from the adjusting axis.

8. The auxiliary device as claimed in claim 7, wherein said second plug portion is disposed on and projects from said secured portion of said operating member along the inclining axis, said second socket portion being disposed in said anchoring member and being sleeved rotatably on said second plug portion so as to permit rotation of said operating member relative to said anchoring member about the inclining axis.

9. The auxiliary device as claimed in claim 8, further comprising a locking latch mounted in said anchoring member adjacent to said second socket portion and extending and movable radial to the inclining axis between a locking position where said locking latch abuts against said second plug portion, and a releasing position where said locking latch is moved away from said second plug portion, and a biasing member mounted in said anchoring member for biasing said locking latch toward the lockig position.

* * * * *